April 1, 1947.  A. M. SALAZAR  2,418,141
BATTERY HOLDER
Filed Aug. 28, 1944

INVENTOR.
ALFRED M. SALAZAR
BY
ATTORNEY

Patented Apr. 1, 1947

2,418,141

UNITED STATES PATENT OFFICE 2,418,141

BATTERY HOLDER

Alfred M. Salazar, West Islip, N. Y., assignor to Federal Telephone and Radio Corporation, New York, N. Y., a corporation of Delaware Application August 28, 1944, Serial No. 551,486

11 Claims. (Cl. 320—2)

This invention relates to battery charging holders and especially to a holder including connections to a charging circuit.

A purpose of the invention is to provide a novel battery holder in which either one small cell, a large cell, or a series of the smaller cells may be readily inserted and removed and which will automatically apply a charging current of the proper amount and voltage from a common source regardless of the number or size of cells in the holder.

Other purposes are to provide a holder that is simple, strong, cheap, easy to manufacture and convenient to use. Further objects and advantages will appear from the following description considered in connection with the accompanying drawings, in which Fig. 1 is a longitudinal central section through a holder embodying the invention, in proper position for charging a single small cell;

Figure 1:
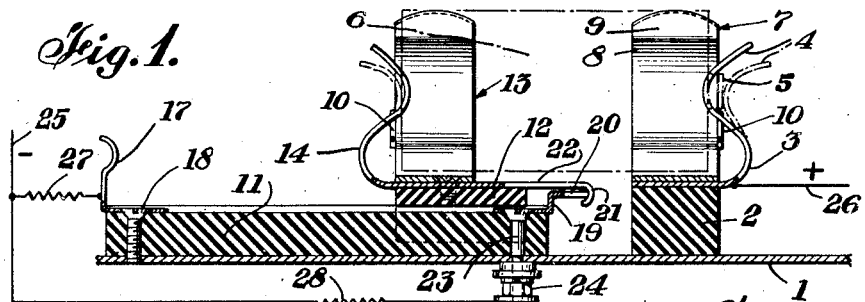

Small storage battery cells have recently been developed which have the same arrangement and dimensions as the usual flash-light cells; and the illustrated embodiment is particularly adapted for convenient charging of storage cells of this type, though it includes features which may be readily applied to the charging of cells of other types and contours.

The holder is mounted on a base or panel 1. A spring clamp support block 2 carries a spring contact 3 having an upturned suitably curved end 4 arranged to bear against the adjacent electrode 5 of a cylindrical cell 6 which fits into a U-shaped spring clamp 7. Clamp 7, contact 3 and block 2 are suitably held in position on the base 1, as by screws passing through said clamp and contact into the block 2 and engaging the base 1 below the block. Clamp 7 includes arcuate sides 8 fitting around portions of the side walls of the cell 6 and having flared upper ends 9 which permit the insertion of the cell in the clamp by lateral pressure. Integral ears 10 extending inwardly from sides 8 are arranged to engage the end of cell 6 and limit its lengthwise movement in the clamp 7.

Figure 4:
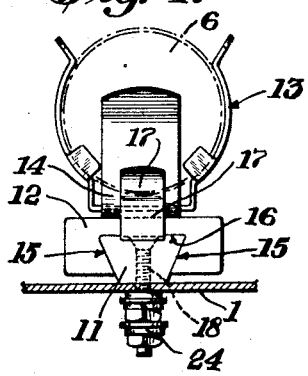
Fig. 4 is an end view from the left of Fig. 2.
Figure 5:
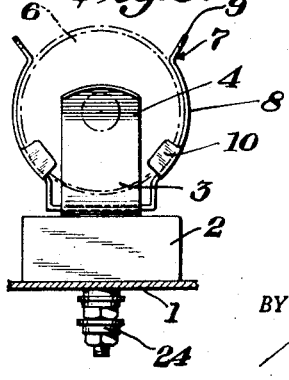
Fig. 5 is an end view from the right of Fig. 2.

A second contact and clamp structure is mounted on the base 1 and arranged for adjustable location relative to contact 3 and clamp 7 so that either one small cell 6 or a larger battery of two cells 6' may be held in the clamps with the electrodes at the exposed ends in engagement with the contacts. In the form illustrated a guide-block 11 of insulating material is mounted on base 1 and carries a slide 12 of similar material on which the clamp 13 and spring contact 14 are mounted, these elements being similar in construction to the clamp 7 and contact 3 already described, and arranged in alignment with the latter. A convenient slide construction is provided by forming guide-block 11 with upwardly diverging sides 15 (Fig. 4) fitting into a mitred channel 16 in the slide 12.

Figure 2:
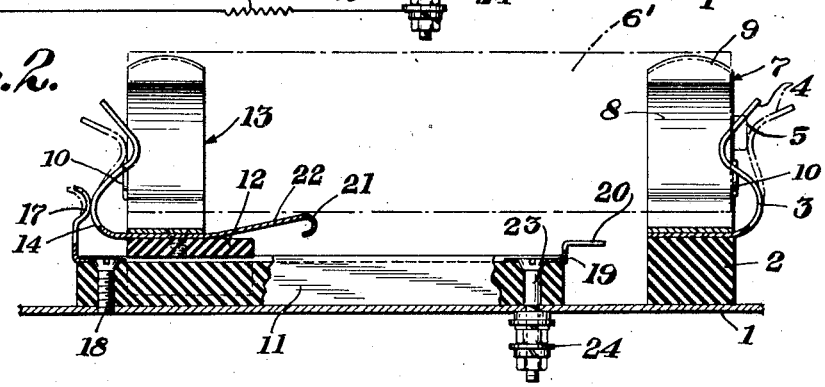
Fig. 2 is a similar view on line 2—2 of Fig. 3 with the holder in position for charging a larger cell.
Figure 3:
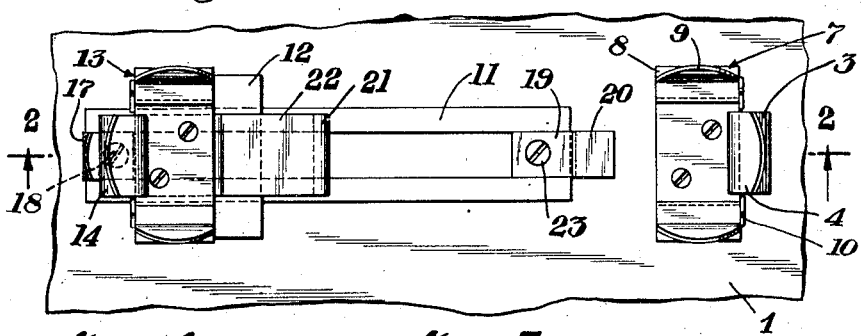
Fig. 3 is a top plan view of the holder in the latter position.

A suitable stop construction for slide 12 is provided, which advantageously constitutes likewise one of the charging contacts. In the form shown this includes a stop arm 17 mounted on block 11 by a screw 18 which passes through the block and into the base 1, serving to hold the block in position on the base. Arm 17 is arranged so that when slide 12 is in outermost position as shown in Figs. 2 and 3 it will engage contact 14 and provide an electrical connection with the adjacent electrode of a cell 6'.

Means is provided for holding the block 12, with its associated clamp and contact, in an intermediate position engaging the end of a cell when less than the maximum number of cells or a single small cell is inserted. In the present embodiment the holder is adapted to retain either one small cell, or a pair of cells in series. The intermediate stop 19 comprises a metal member mounted on block 11 and provided with a projecting nose 20 arranged to engage the hooked end 21 of a resilient latch 22 carried by block 12. Latch 22 is conveniently formed from an extension of contact 14, and is normally deflected away from the nose 20 as indicated in Fig. 2. It may be shifted into engagement with said nose in any desired manner, either by pressure from cell 6' or manually; and while the arrangement is illustrated as being engaged by depressing the latch 22 and disengaged by a slight releasing movement of block 12, it will be apparent that the reverse arrangement may be employed, the hook 21 being curved to ride over the nose 20 during advance of the block into single cell-holding position.

The stop 19 is advantageously held in place by a screw 23 extending through block 11 into engagement with base 1; and the projecting portion of said screw may be utilized as a binding post 24 providing a connection to the rear electrode of cell 6 when the block 12 is in inner position.

The described construction is especially adapted for convenient electrical connection to a charging circuit. The negative lead 25 may be connected to stop 17 and the positive lead 26 to contact 4. A relatively low resistor 27 is connected between stop 17 and the negative lead 25, while a relatively high resistor 28 is connected between the negative lead 25 and the binding post 24, which is electrically connected through screw 23 to stop 19 and thence through latch 22 to contact 14 when the slide 12 is in inner position.

The holder is extremely convenient and simple to operate. After setting it for charging a cell or cells of predetermined size by locating the slide 12 in proper position, and interengaging latch 22 and stop 19 if necessary, the cell or cells are simply pressed into position in clamps 7 and 13. Charging automatically starts and continues as long as the holder is loaded. Removal of the cell or cells immediately breaks the circuit. If two cells or a single large battery of two cells are inserted, the voltage between leads 25 and 26 is appropriate for charging two cells, while the high resistor 28 is of suitable value to reduce the voltage to that appropriate for charging a single cell, which is applied between stop 19 and contact 3.

The metal parts may be made of any suitable conducting spring metal, such as steel or brass, and are designed so that they can be readily blanked out from strip material. The insulating elements may be of any suitable material such as a synthetic resin, "Bakelite" being one appropriate material. The base 1 may likewise be of insulating material, but if it is not, one or both of the screws 18, 23 will of course be insulated from the base, which may be utilized to carry one side of the circuit if desired, the corresponding screw 18 or 23 making such an arrangement particularly convenient and effective.

While a preferred embodiment has been disclosed in detail and certain variations have been indicated, this disclosure is not intended to be restrictive, since other modifications may be introduced within the scope of the invention as set forth in the claims. For instance, while only a single stop 19 and associated slide structure has been shown, it will be evident that the invention in its broader aspects is not limited to such an arrangement. Moreover, the cell supporting and contacting structures may be adapted to cells of other types and contours, though the invention is particularly advantageous for providing a simple, convenient and efficient charger for small cells of the indicated type.

What is claimed is:

1. A battery charging holder comprising a base, a battery cell-holding member, an electrode contact associated with the member, a movable cell-holding member, a second electrode contact associated and movable with the latter member, a plurality of charging contacts each connected to the movable contact in a different position of the movable holding member, and a voltage regulating resistor connected to at least one of said charging contacts.

2. A battery charging holder as set forth in claim 1, in which the first electrode contact and said charging contacts are arranged for connection with a charging circuit, and in which said charging contacts include one end contact and an intermediate contact, in combination with a voltage-regulating resistor connected between the end contact and the intermediate contact.

3. A battery charging holder comprising a base, a battery cell-holding member fixed to the base, an electrode contact associated with said member, a movable cell-holding member, a sliding support carrying the latter member and slidably mounted on the base, a second electrode contact mounted on the slidable support, a plurality of fixed charging contacts mounted on the base and each engaging the second contact in a different position of the movable support, means for retaining the support in each of said positions, and a voltage regulating resistor connected to at least one of said charging contacts.

4. A battery charging holder as set forth in claim 3 in which the retaining means includes the contacts on the base.

5. A battery charging holder as set forth in claim 3 in which the cell-holding members comprise spring clamps.

6. A battery charging holder comprising a base, a battery cell-holding member mounted on the base, an associated electrode contact mounted on the base, a movable cell-holding member, a support for the latter member slidably mounted on the base, a second electrode contact mounted on the support, a stop for the support including a contact element engaging the movable contact, a second stop for the support in another position, including a second contact element engaging the second contact and arranged for connection to a charging circuit pole, and a voltage regulating resistor connected to said first stop contact element arranged for connection to a second charging circuit pole.

7. A battery charging holder as set forth in claim 6, in which the movable contact comprises a metal member having an extension engaging the second contact element.

8. A battery charging holder as set forth in claim 6, in which the movable contact is an integral metal member having a hooked extension engaging the second contact element.

9. A battery charging holder comprising a base, a battery cell-holding clamp affixed to the base, an electrode contact associated with the clamp, a movable cell-holding clamp, a support therefor slidably mounted on the base, a second electrode contact mounted on the support, a metal stop and connecting member engaging the second contact in the outer position of the support, an inner contact and stop element mounted on the base, a metal locking and contacting member carried by the support, connected to the second electrode contact and detachably engaging the second contact and stop member when the support is in an inner position, and a voltage regulating resistor having one end connected to said locking member and arranged for connection to a charging circuit pole.

10. A battery holder adapted to hold and connect different size batteries of respectively different voltages to respectively different potential sources, comprising a base, a first battery holding member and a first battery electrode contact attached to said base at one end of said member, a second battery holding member and a second battery electrode contact, means adjustably attaching said second battery holding member and said second battery electrode contact relatively to said base and said first battery holding member, one of said contacts adapted to be connected to a predetermined potential source, means adapted to create a difference in potential between said one spaced contact and at least one other spaced contact, and means electrically connected to and movable with said battery electrode contact, engaging different spaced contacts in dependence upon the position of said second battery holding member and said second battery electrode contact relatively to said first battery holding member.

11. The combination according to claim 10, in which said last means is a resistor.

ALFRED M. SALAZAR.

REFERENCES CITED

The following references are of record in the file of this patent:

UNITED STATES PATENTS

| Number | Name | Date |
|---|---|---|
| 1,609,009 | Baine | Nov. 30, 1926 |
| 1,459,336 | Link | June 19, 1923 |
| 2,036,547 | Siemon | Apr. 7, 1936 |